(12) United States Patent
Kim

(10) Patent No.: US 12,453,409 B2
(45) Date of Patent: Oct. 28, 2025

(54) ELECTRIC TOOTHBRUSH

(71) Applicant: Proxihealthcare Inc., Ulsan (KR)

(72) Inventor: Young Wook Kim, Seoul (KR)

(73) Assignee: Proxihealthcare Inc., Ulsan (KR)

( * ) Notice: Subject to any disclaimer, the term of this patent is extended or adjusted under 35 U.S.C. 154(b) by 0 days.

(21) Appl. No.: 18/007,908

(22) PCT Filed: Dec. 15, 2021

(86) PCT No.: PCT/KR2021/019127
§ 371 (c)(1),
(2) Date: Dec. 2, 2022

(87) PCT Pub. No.: WO2023/038207
PCT Pub. Date: Mar. 16, 2023

(65) Prior Publication Data
US 2024/0008634 A1    Jan. 11, 2024

(30) Foreign Application Priority Data
Sep. 8, 2021   (KR) ........................ 10-2021-0119781

(51) Int. Cl.
*A46B 15/00*   (2006.01)
*A61C 17/22*   (2006.01)
*F21V 33/00*   (2006.01)

(52) U.S. Cl.
CPC ...... *A46B 15/0022* (2013.01); *A46B 15/0036* (2013.01); *A61C 17/22* (2013.01); *F21V 33/0064* (2013.01); *A61C 2204/002* (2013.01)

(58) Field of Classification Search
CPC ..... A61C 17/34; A46B 15/036; A46B 15/022; A46B 13/023
See application file for complete search history.

(56) References Cited

FOREIGN PATENT DOCUMENTS

| EP | 3380038 B1 * | 6/2021 | ......... A46B 15/0024 |
| WO | WO-2017216606 A1 * | 12/2017 | ......... A46B 15/0022 |

* cited by examiner

*Primary Examiner* — Shay Karls
(74) *Attorney, Agent, or Firm* — NKL LAW; Jae Youn Kim

(57) ABSTRACT

The present invention relates to an electric toothbrush that includes an outer case including a handle part having a tubular shape, and a head part extending from the handle part and having an opening area open to front; first and second electrodes disposed in the opening area and providing electromagnetic waves corresponding to a driving signal; and a head cover having a plurality of bristle holes, a first electrode hole, and a second electrode hole, which are formed therein, and closing the opening area. The first and second electrodes may penetrate the first and second electrode holes, respectively, and be exposed to outside.

6 Claims, 11 Drawing Sheets

ELECTRIC TOOTHBRUSH

TECHNICAL FIELD

The present invention relates to an electric toothbrush capable of effectively removing dental plaque in the oral cavity by utilizing microcurrent special electromagnetic waves.

BACKGROUND ART

Dental plaque is a sticky and transparent film that adheres to the surface of teeth. The dental plaque is formed as numerous germs (bacteria) living in the mouth adhere to certain components in saliva. The dental plaque may be formed not only on and around the teeth, but also around prostheses, braces, and dentures.

When the dental plaque in the form of a very thin and transparent film is created, the bacteria in the plaque proliferate and also increase exponentially using the sugar supplied when food is consumed. The acidic substances produced by the bacteria in the plaque dissolve the lime in the teeth, causing tooth decay, and the toxins cause inflammation in the gums.

The dental plaque itself is difficult to see with the naked eye, and it mainly occurs in deep valleys of teeth, narrow gaps between teeth, and narrow gaps between teeth and gums. Because the plaque causes problems to teeth and surrounding tissues in such a small space, it is important to remove the plaque without missing every corner, but there is a problem in that it is difficult to effectively remove such plaque using only a conventional toothbrush.

DISCLOSURE

Technical Problem

In order to solve the above problems, the present invention is intended to provide an electric toothbrush capable of effectively removing dental plaque.

In addition, the present invention is intended to provide an electric toothbrush capable of preventing tooth decay and periodontal disease through the removal of dental plaque.

In addition, the present invention is intended to provide an electric toothbrush that amplifies oral care effects by utilizing a driving signal including an AC component and a DC component.

Technical Solution

An electric toothbrush according to an embodiment of the present invention may include an outer case including a handle part having a tubular shape, and a head part extending from the handle part and having an opening area open to front, first and second electrodes disposed in the opening area and providing electromagnetic waves corresponding to a driving signal, and a head cover having a plurality of bristle holes, a first electrode hole, and a second electrode hole, which are formed therein, and closing the opening area. The first and second electrodes may penetrate the first and second electrode holes, respectively, and be exposed to outside.

In addition, the electric toothbrush may further include a main substrate on which a signal supply unit for generating the driving signal is mounted, and being accommodated in the handle part, and a sub-substrate elongated from the main substrate toward the head part and having an end portion positioned within the opening area. A first substrate hole and a second substrate hole may be formed at the end portion of the sub-substrate. The first electrode may be inserted into and fixed to the first substrate hole, and the second electrode may be inserted into and fixed to the second substrate hole.

In addition, at least one light-emitting diode (LED) may be disposed at the end portion of the sub-substrate.

In addition, the first electrode may include a first-first electrode portion inserted into the first substrate hole, a first-second electrode portion inserted into the first electrode hole, and a first-third electrode portion disposed between the first-first electrode portion and the first-second electrode portion and electrically connected to the sub-substrate, and the second electrode may include a second-first electrode portion inserted into the second substrate hole, a second-second electrode portion inserted into the second electrode hole, and a second-third electrode portion disposed between the second-first electrode portion and the second-second electrode portion and electrically connected to the sub-substrate.

In addition, the electric toothbrush may further include an inner case including a substrate support part where the main substrate is disposed and supported, and a battery accommodating part where a battery is located, the inner case being accommodated in the outer case.

In addition, the main substrate may have a plurality of connecting recesses, and the substrate support part may have a plurality of fastening portions extending in one direction through the connecting recesses and fastened to the main substrate.

In addition, at least one row of bristle holes may be arranged between the first electrode hole and the second electrode hole.

Advantageous Effects

According to the present invention, it is possible to provide an electric toothbrush capable of effectively removing dental plaque.

In addition, according to the present invention, it is possible to provide an electric toothbrush capable of preventing tooth decay and periodontal disease through the removal of dental plaque.

In addition, according to the present invention, it is possible to provide an electric toothbrush that amplifies oral care effects by utilizing a driving signal including an AC component and a DC component.

DESCRIPTION OF DRAWINGS

Figure 4:
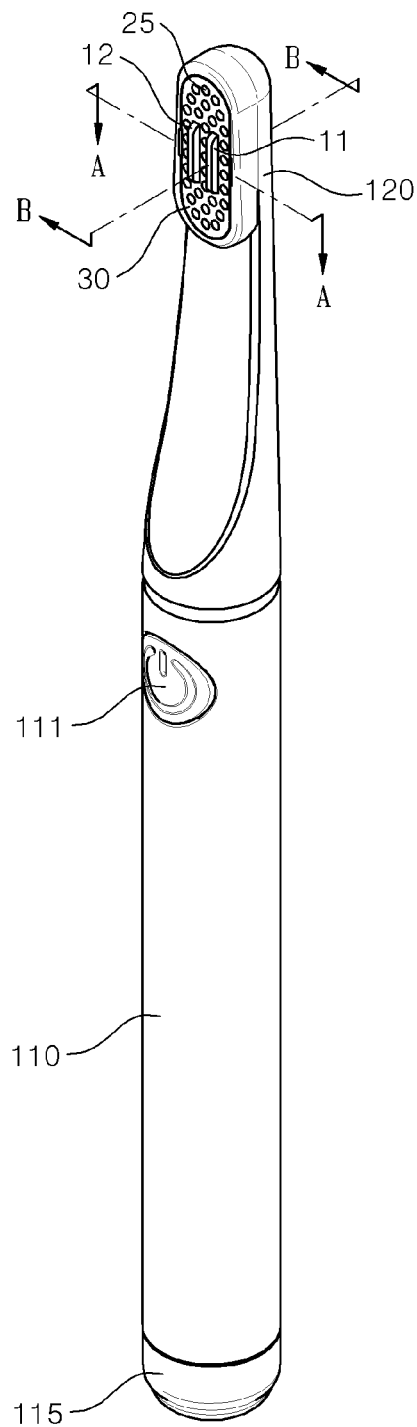
FIG. 4 is a view showing a state in which a head cover is combined with an electric toothbrush according to an embodiment of the present invention.

FIG. 7B is a view showing a cross section (based on line B) of the electric toothbrush shown in FIG. 4.

Figure 8:
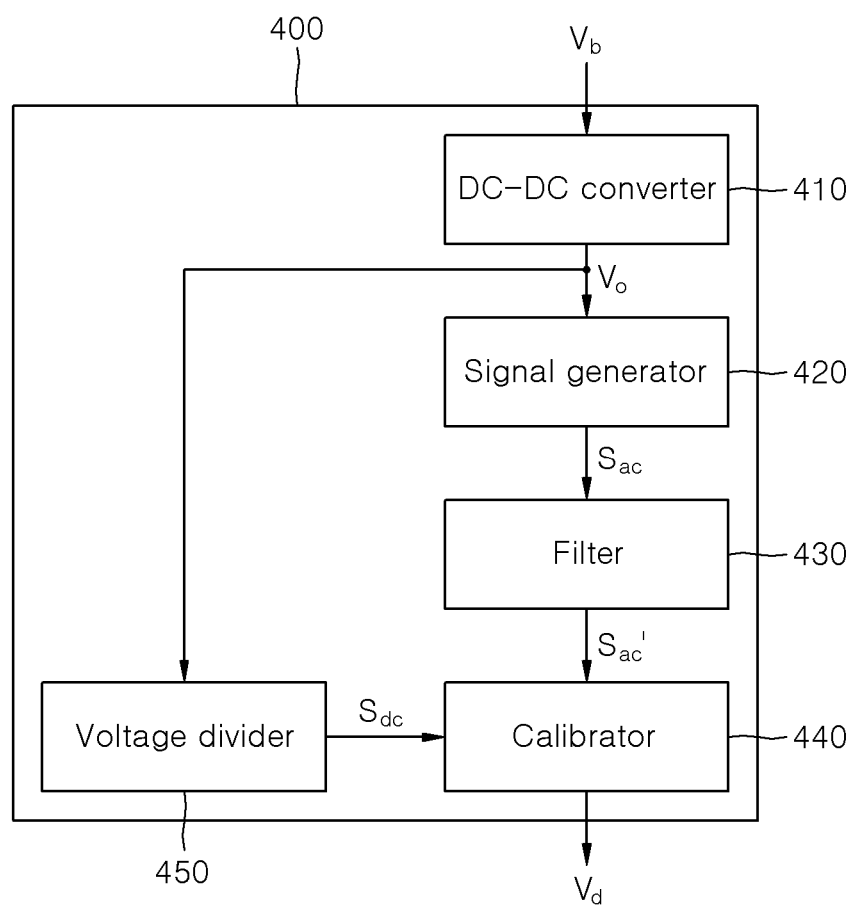

FIG. 8 is a view showing a signal supply unit according to an embodiment of the present invention.

Figure 9A:
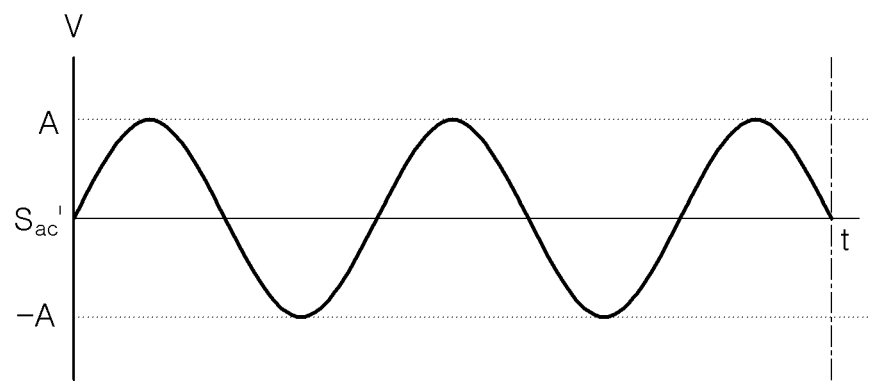
Figure 9B:
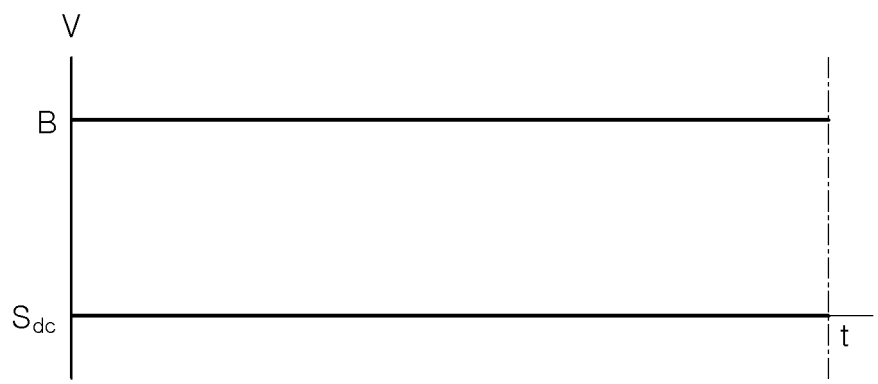
Figure 9C:
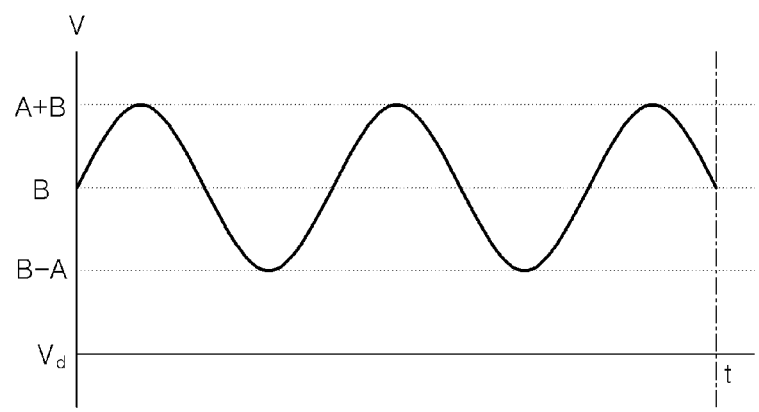

FIGS. 9A to 9C are views showing waveforms of signals according to an embodiment of the present invention.

Figure 10A:
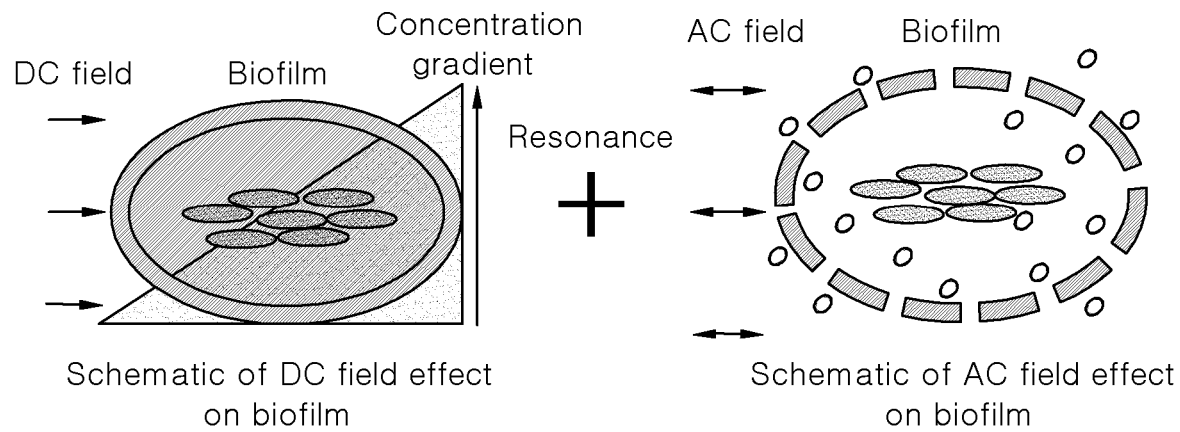
Figure 10B:
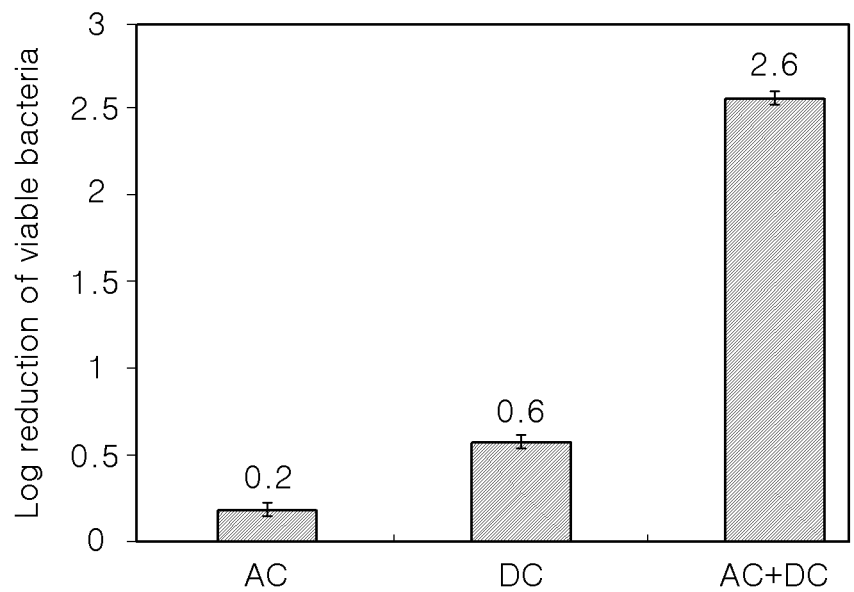

FIGS. 10A and 10B are views showing biofilm removal effects of a driving signal generated by mixing an AC signal and a DC signal.

Figure 11A:
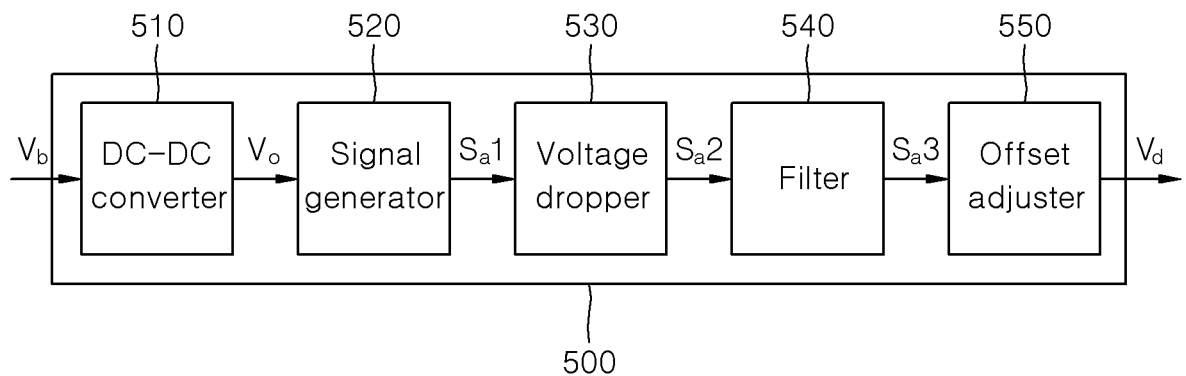
Figure 11B:
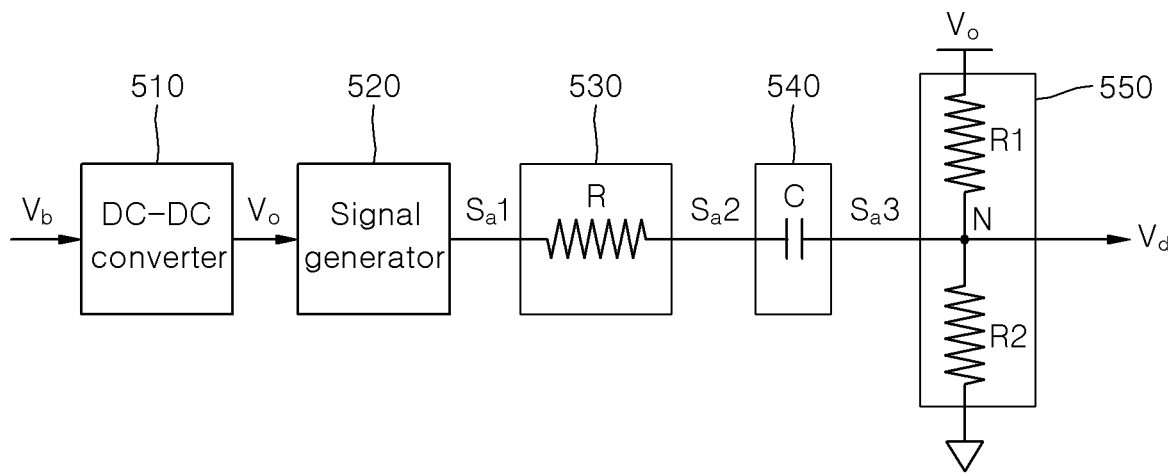

FIGS. 11A and 11B are views showing a signal supply unit according to another embodiment of the present invention.

BEST MODE

Hereinafter, embodiments of the present invention will be described in detail with reference to the accompanying drawings. However, the present invention is not limited to the embodiments disclosed below and may be implemented in various different forms. Also, it should be understood that all modifications, equivalents, or replacements thereof are included within the subject matter and scope of the present invention.

In describing elements of the present invention, terms such as first, second, A, B, (a), and (b) may be used. These terms are only used to distinguish one element from other elements, and the nature, sequence, or order of that element is not limited by the term. Further, in this specification, when an element is described as being "connected", "combined", or "coupled" to/with any other element, the element may be directly connected, combined, or coupled to/with the other element, or another element may be connected, combined, or coupled between both elements. In the case of being "connected", "combined", or "coupled", it may be understood as being physically or electrically connected, combined, or coupled.

Terms such as "~unit", "~er", "part", and "~module" used in this specification refer to a unit that processes at least one particular function or operation, and may be implemented with hardware, software, or a combination thereof. In addition, terms such as "comprise", "include", and "have" used in this specification denote the presence of a stated element unless the relevant context clearly indicates otherwise, and do not exclude the presence of or a possibility of addition of one or more other elements.

In this specification, the distinction between elements is only a distinction by a main function performed by each element. That is, two or more elements to be described below may be combined into one element, or one element may be divided into two or more elements according to subdivided functions. Also, each element to be described below may further perform some or all of functions performed by other elements in addition to the main function thereof, and a part of the main function of each element may be performed by other elements.

Now, an electric toothbrush according to an embodiment of the present invention will be described with reference to drawings related to the embodiment.

Figure 1:
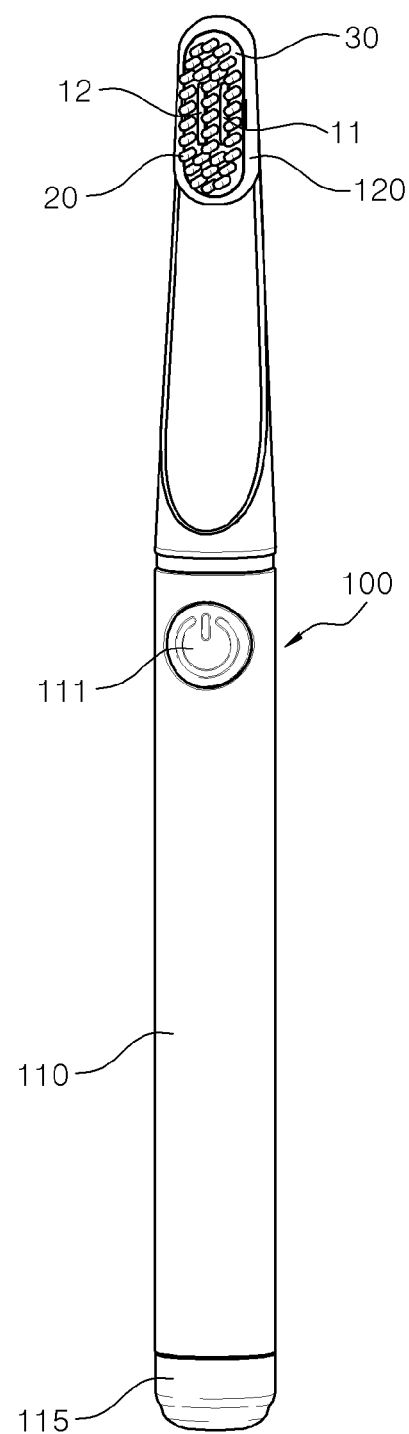
FIG. 1 is a view showing an electric toothbrush according to an embodiment of the present invention.
Figure 2:
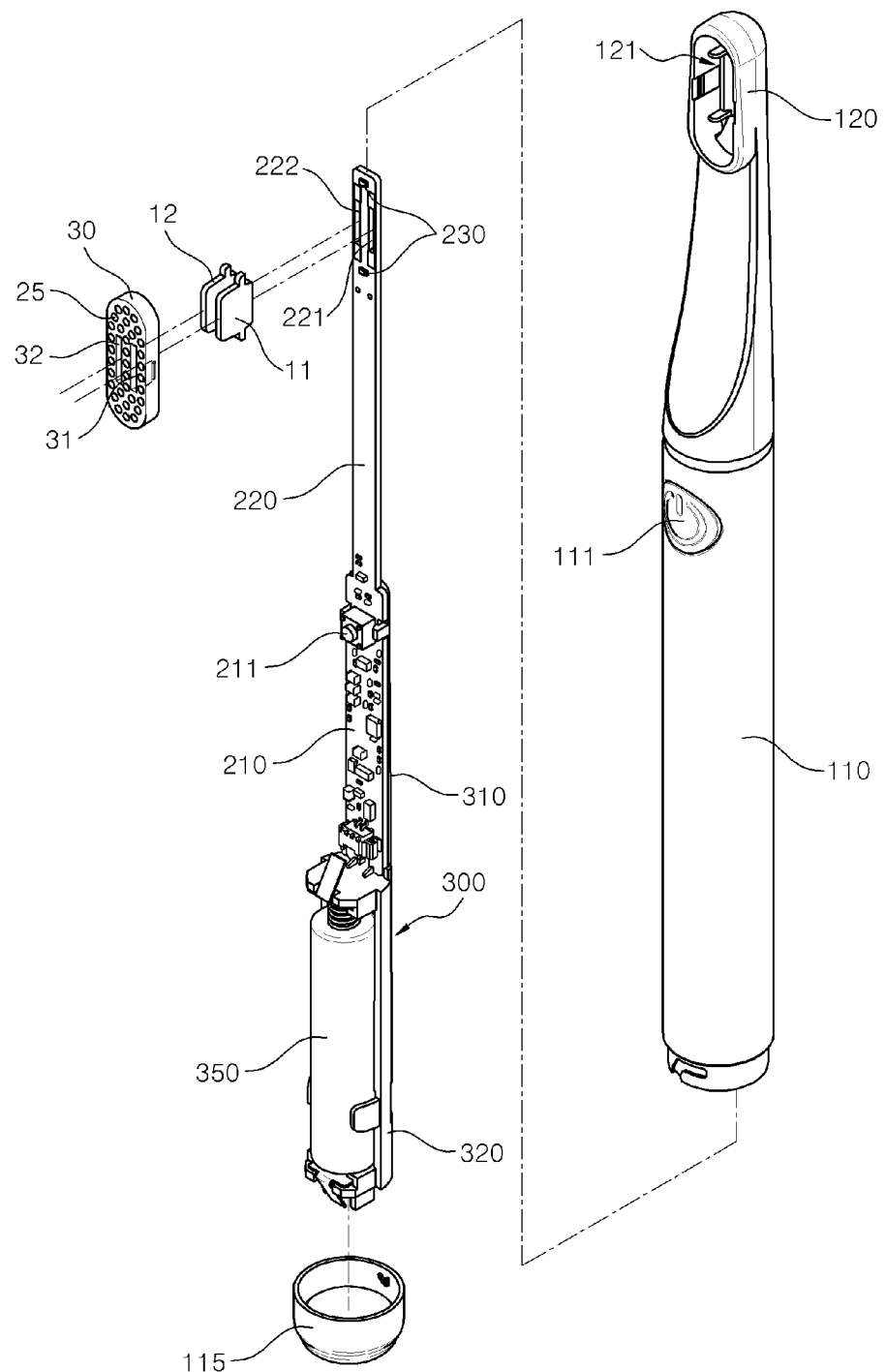
FIG. 2 is a view showing an exploded state of the electric toothbrush shown in FIG. 1.
Figure 3:
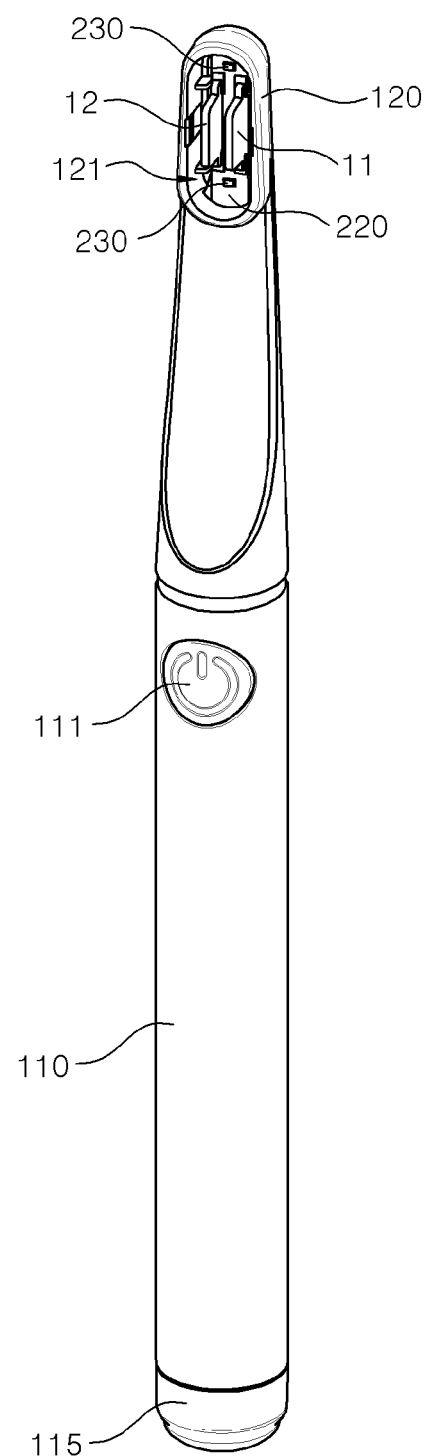
FIG. 3 is a view showing a state in which a head cover is separated from an electric toothbrush according to an embodiment of the present invention.

FIG. 1 is a view showing an electric toothbrush according to an embodiment of the present invention, and FIG. 2 is a view showing an exploded state of the electric toothbrush shown in FIG. 1. In addition, FIG. 3 is a view showing a state in which a head cover is separated from an electric toothbrush according to an embodiment of the present invention, and FIG. 4 is a view showing a state in which a head cover is combined with an electric toothbrush according to an embodiment of the present invention.

Referring to FIGS. 1 and 2, the electric toothbrush according to an embodiment of the present invention may include an outer case 100, a plurality of electrodes 11 and 12, a head cover 30, and the like.

The outer case 100 forms the overall body of the electric toothbrush and may include a handle part 110 and a head part 120.

The handle part 110 has a tubular shape having a predetermined length and an internal accommodating space and may be designed in the form of being able to be gripped by a user using the electric toothbrush.

A battery 350 for supplying power may be accommodated inside the handle part 110, and a battery cap 115 used for replacement of the battery 350 may be separately mounted at the end of the handle part 110.

In addition, the handle part 110 may include a switch area 111, which may be formed at a position corresponding to a switch 211 disposed inside the handle part 110.

Therefore, the user can control the on/off of the internal switch 211 by pressing the switch area 111. That is, the user can turn on the power of the electric toothbrush by pressing the switch area 111 when brushing starts, and thus a driving signal generated from a signal supply unit can be supplied to the electrodes 11 and 12 to generate an electric field for the removal of dental plaque.

The head part 120 extends along the longitudinal direction of the handle part 110 and may have an opening area 121 open to the front at the end thereof.

The first electrode 11 and the second electrode 12 may be disposed in the opening area 121 of the head part 120 and may provide electromagnetic waves corresponding to the driving signal supplied from the signal supply unit to the outside.

The first electrode 11 and the second electrode 12 may be spaced apart from each other. For example, the first electrode 11 may be set as a positive electrode receiving the driving signal, and the second electrode 12 may be set as a negative electrode.

In addition, the first electrode 11 and the second electrode 12 may be formed of a material such as, but not limited to, brass, aluminum, conductive polymer, conductive silicon, or stainless steel, and any material having conductivity may be used as an electrode material.

The head cover 30 may have a shape corresponding to the opening area 121 of the head part 120 and may close the opening area 121 by being combined with the opening area 121 where the electrodes 11 and 12 are disposed.

In addition, the head cover 30 may have a plurality of bristle holes 25, a first electrode hole 31, and a second electrode hole 32, which are formed therein.

Bristles 20 may be inserted into and fixed to the plurality of bristle holes 25 formed on the surface of the head cover 30. The arrangement structure, number, size, etc. of these bristles 20 are not particularly limited and may be changed in various forms.

For example, at least one row of bristle holes 25 may be arranged between the first electrode hole 31 and the second electrode hole 32, and thus at least one row of bristles 20 may be arranged between the first electrode 11 and the second electrode 12.

When the head cover 30 is combined with the opening area 121 of the head part 120, the first and second electrodes 11 and 12 may penetrate the first and second electrode holes 31 and 32 of the head cover 30, respectively, and be exposed to the outside.

Meanwhile, the electric toothbrush according to an embodiment of the present invention may further include a main substrate 210 and a sub-substrate 220.

The switch 211 for controlling power supply from the battery 350, and the signal supply unit for generating the driving signal may be mounted on the main substrate 210, and the main substrate 210 may be accommodated in the handle part 110.

In addition, the main substrate 210 may be electrically connected to the battery 350 to receive a battery voltage.

The sub-substrate 220 may be elongated from the main substrate 210 toward the head part 120 and may have an end portion positioned within the opening area 121 of the head part 120. That is, the sub-substrate 220 may have a shape elongated along the longitudinal direction of the outer case 100 and may be set to have a different width from that of the main substrate 210. For example, the sub-substrate 220 may be designed to have a smaller width than the main substrate 210.

A first substrate hole 221 and a second substrate hole 222 may be formed at the end portion of the sub-substrate 220 exposed to the outside through the opening area 121.

The first electrode 11 may be inserted into and fixed to the first substrate hole 221, and the second electrode 12 may be inserted into and fixed to the second substrate hole 222.

In addition, at least one light-emitting diode (LED) 230 may be disposed at the end portion of the sub-substrate 220. The LED 230 may emit light in the case of power-on of the electric toothbrush to indicate whether the electric toothbrush is driven.

When the head cover 30 is installed on the head part 120, the opening area 121 may be closed, and the first and second electrodes 11 and 12 may be inserted into the first and second electrode holes 31 and 32 of the head cover 30, respectively, and exposed to the outside.

As described above, in the case of using the sub-substrate 220 integrally formed with the main substrate 210, there are advantages of omitting a complicated wiring process for electrically connecting the main substrate 210 and the electrodes 11 and 12 and also easily installing and controlling the LED 230.

Figure 5:
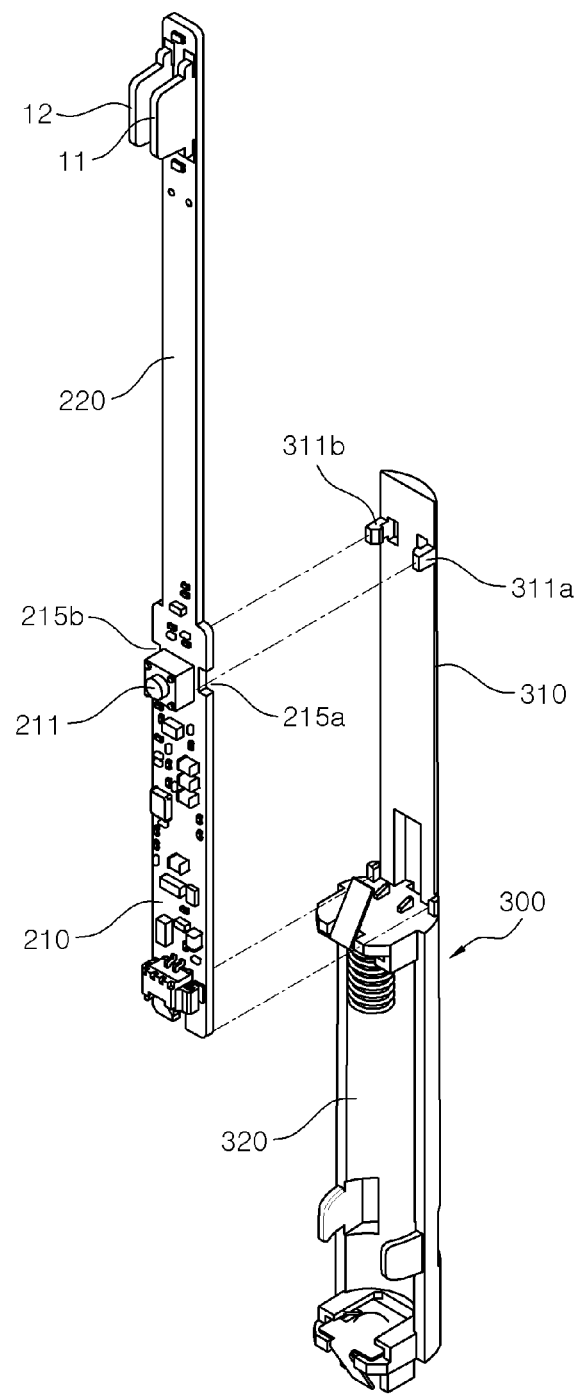
FIG. 5 is a view showing an inner case according to an embodiment of the present invention.
Figure 6:
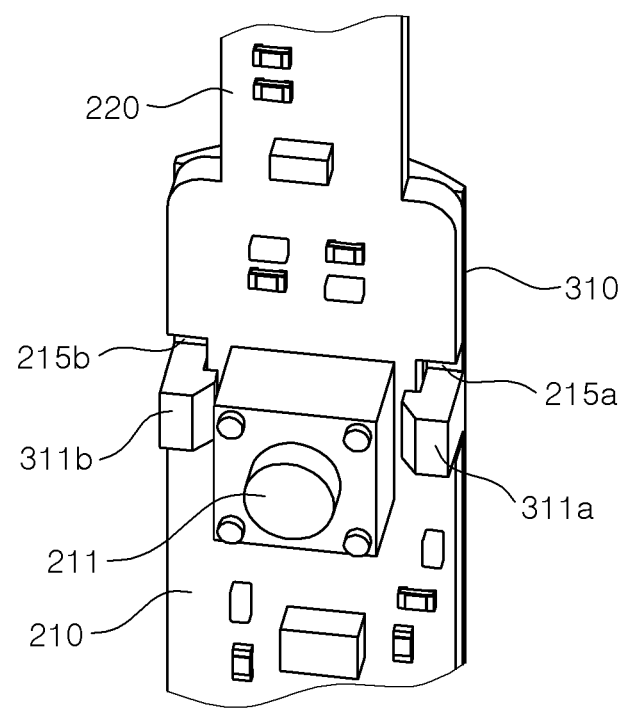
FIG. 6 is a view showing a combined state of a main substrate and a substrate support part according to an embodiment of the present invention.

FIG. 5 is a view showing an inner case according to an embodiment of the present invention, and FIG. 6 is a view showing a combined state of a main substrate and a substrate support part according to an embodiment of the present invention.

Referring to FIGS. 5 and 6, the electric toothbrush according to an embodiment of the present invention may further include an inner case 300 accommodated in the outer case 100.

The inner case 300 may include a substrate support part 310 where the main substrate 210 is disposed, and a battery accommodating part 320 where the battery 350 is located.

A battery terminal electrically connected to the main substrate 210 may be installed in the battery accommodating part 320, and the battery 350 may be inserted into the battery accommodating part 320 and electrically connected to the battery terminal.

For example, the battery 350 may be set as a primary battery or a secondary battery.

When the battery 350 is a primary battery, the user may periodically replace the battery 350, and when the battery 350 is a secondary battery, charging may be performed through various charging schemes.

For example, the battery 350 may be charged through a wireless charging scheme or a wired charging scheme while being located in the battery accommodating part 320, and may also be charged through a separate charging device by being separated from the battery accommodating part 320.

The substrate support part 310 may extend from the battery accommodating part 320 in the longitudinal direction, and the main substrate 210 may be placed on and supported by one surface of the substrate support part 310.

For a fixed combination with the main substrate 210, a plurality of fastening portions 311a and 311b may be formed on the substrate support part 310. For example, the fastening portions 311a and 311b may have a shape protruding in one direction from both sides of the substrate support part 310 and may be designed to have a bent end (e.g., a hook shape).

In addition, the main substrate 210 may have a plurality of connecting recesses 215a and 215b formed on both sides thereof corresponding to the fastening portions 311a and 311b. In this case, the fastening portions 311a and 311b may be located in the connecting recesses 215a and 215b and engaged with the main substrate 210 through the bent end, thereby being fastened to the main substrate 210.

Figure 7A:
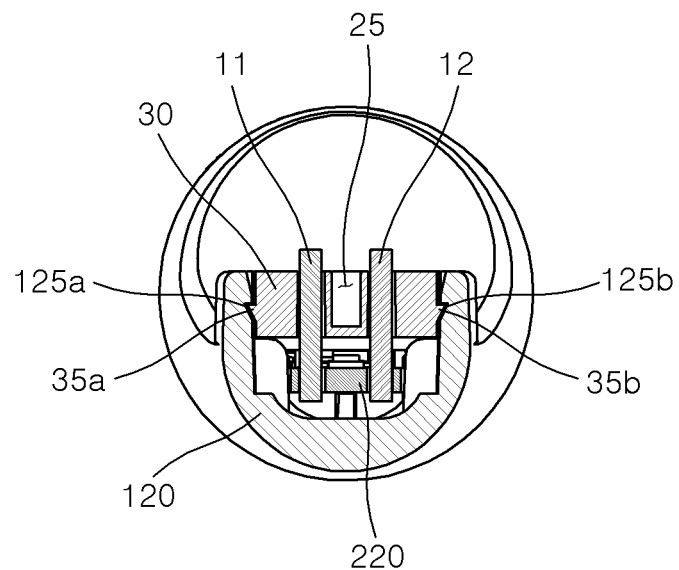
FIG. 7A is a view showing a cross section (based on line A) of the electric toothbrush shown in FIG. 4.
Figure 7B:
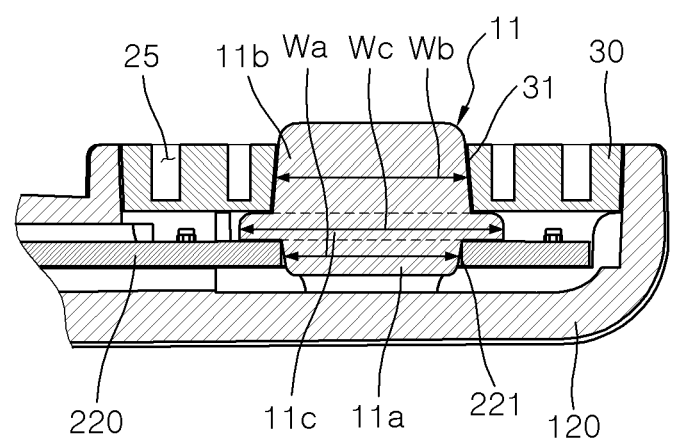

FIG. 7A is a view showing a cross section (based on line A) of the electric toothbrush shown in FIG. 4, and FIG. 7B is a view showing a cross section (based on line B) of the electric toothbrush shown in FIG. 4.

Referring to FIG. 7A, a plurality of protrusions 35a and 35b may be formed on both sides of the head cover 30. In addition, a plurality of fastening hollows 125a and 125b corresponding to the protrusions 35a and 35b may be formed on the inner surface of the head part 120 forming the edge of the opening area 121.

Through the above-described structure, the protrusions 35a and 35b and the fastening hollows 125a and 125b are combined with each other when the head cover 30 is inserted into the opening area 121 of the head part 120, so that the head cover 30 can be easily fastened to the opening area 121 of the head part 120.

Referring to FIG. 7B, the first electrode 11 may include a first-first electrode portion 11a inserted into the first substrate hole 221 of the sub-substrate 220, a first-second electrode portion 11b inserted into the first electrode hole 31 of the head cover 30, and a first-third electrode portion 11c disposed between the first-first electrode portion 11a and the first-second electrode portion 11b and electrically connected to the sub-substrate 220.

The width (Wc) of the first-third electrode portion 11c may be set to be different from the width (Wa) of the first-first electrode portion 11a and the width (Wb) of the first-second electrode portion 11b. For example, the width (Wc) of the first-third electrode portion 11c may be set to be greater than the width (Wa) of the first-first electrode portion 11a and the width (Wb) of the first-second electrode portion 11b.

Therefore, both lateral ends of the first-third electrode portion 11c are disposed between the head cover 30 and the sub-substrate 220, thus not only supporting the head cover 30, but also being in contact with the sub-substrate 220 to enable electrical connection with the sub-substrate 220.

Meanwhile, although FIG. 7B exemplarily shows the first electrode 11, the second electrode 12 may also be designed in the same shape as the first electrode 11.

For example, the second electrode 12 may include a second-first electrode portion inserted into the second substrate hole 222 of the sub-substrate 220, a second-second electrode portion inserted into the second electrode hole 32 of the head cover 30, and a second-third electrode portion disposed between the second-first electrode portion and the second-second electrode portion and electrically connected to the sub-substrate 220.

The width of the second-third electrode portion may be set to be different from the width of the second-first electrode portion and the width of the second-second electrode portion. For example, the width of the second-third electrode portion may be set to be greater than the width of the second-first electrode portion and the width of the second-second electrode portion.

Therefore, both lateral ends of the second-third electrode portion are disposed between the head cover 30 and the sub-substrate 220, thus not only supporting the head cover 30, but also being in contact with the sub-substrate 220 to enable electrical connection with the sub-substrate 220.

FIG. 8 is a view showing a signal supply unit according to an embodiment of the present invention, and FIGS. 9A to 9C are views showing waveforms of signals according to an embodiment of the present invention. In particular, FIG. 9A shows a filtered AC signal (Sac'), FIG. 9B shows a DC signal (Sdc), and FIG. 9C shows a driving signal (Vd) generated by mixing the filtered AC signal (Sac') and the DC signal (Sdc). In addition, FIGS. 10A and 10B are views showing biofilm removal effects of a driving signal generated by mixing an AC signal and a DC signal.

Referring to FIG. 8, the signal supply unit 400 mounted on the main substrate 210 may generate the driving signal (Vd) by using a battery voltage (Vb) supplied from the battery 350.

In particular, the signal supply unit 400 may generate the driving signal (Vd) by mixing an alternating current (AC) signal and a direct current (DC) signal.

Therefore, the drive signal (Vd) includes both AC and DC components, and the synergistic effect and resonance occurrence caused by simultaneously applying the AC and DC components can increase the effect of removing biofilm that is the cause of dental plaque.

Referring to FIG. 10A, the electric field caused by the DC component can induce a local imbalance in charge distribution, thereby increasing the structural stress of the biofilm, and the electric field caused by the AC component can increase the permeability of an outer shield through the generation of specific vibrations.

The synergistic effect of the AC and DC components can be seen in FIG. 10B. That is, compared to the biofilm removal effect when the electric field by the AC component and the electric field by the DC component are provided alone, it can be seen that the biofilm removal effect is far superior when the electric field by the AC component and the electric field by the DC component are overlapped and provided simultaneously.

Because the electric field by the DC component and the electric field by the AC component may be simultaneously provided through the electrodes 11 and 12 by the drive signal (Vd) supplied by the signal supply unit 400 according to an embodiment of the present invention, it is possible to achieve the enhanced effect of the above-described biofilm removal.

In addition, as the driving signal (Vd) is set in the form of overlapping the AC voltage and the DC voltage as described above, the risk of electric shock and the pain that may be caused to the body can be reduced, compared to the case of applying only the DC voltage.

Meanwhile, the signal supply unit 400 according to an embodiment of the present invention may include a DC-DC converter 410, a signal generator 420, a filter 430, and a calibrator 440, and may further include a voltage divider 450.

The DC-DC converter 410 may receive a battery voltage (Vb), convert the battery voltage (Vb) into an output voltage (Vo) of a predetermined level, and output the output voltage (Vo).

The signal generator 420 operates based on the voltage supplied from the DC-DC converter 410, and may generate an AC signal (Sac) having a predetermined frequency by using the output voltage (Vo) of the DC-DC converter 410.

The signal generator 420 may be implemented using a known configuration capable of generating an AC signal, such as an oscillator or a function generator.

For example, the AC signal (Sac) may be set to a frequency of 1 KHz to 1000 MHz. This is because when the AC signal (Sac) is set to a low frequency of less than 1 KHz, the biofilm removal effect is reduced, and even when the AC signal (Sac) is set to a very high frequency of more than 1000 MHz, the biofilm removal effect is reduced. Meanwhile, the frequency of the AC signal (Sac) may be set to a frequency of 5 MHz to 15 MHz suitable for the biofilm removal.

In addition, the amplitude of the AC signal (Sac) may be set to 0.1 mv to 3 V. If the amplitude of the AC signal (Sac) is less than 0.1 mV, it is difficult to expect a plaque removal effect, and if the amplitude of the AC signal (Sac) exceeds 3 V, there is a concern that toxic substances may be generated due to electrolysis of body fluids.

The filter 430 may perform a filtering operation on the AC signal (Sac) generated by the signal generator 420. For example, the filter 430 may include a band pass filter and convert a sawtooth wave type AC signal (Sac) into a sine wave type AC signal (Sac'). However, the type of filter 430 is not limited to the above, and various types of filters may be employed depending on the design structure.

The calibrator 440 may generate the driving signal (Vd) by mixing the DC signal (Sdc) with the AC signal (Sac') supplied through the filter 430. For example, the calibrator 440 may be implemented as, but is not limited to, an operating amplifier capable of summing (or overlapping) the AC signal (Sac') and the DC signal (Sdc).

Therefore, an offset corresponding to the DC signal (Sdc) is generated in the AC signal (Sac'), and the driving signal (Vd) having both the AC and DC components can be generated.

Because the driving signal (Vd) includes all the characteristics of the AC signal (Sac), the driving signal (Vd) may be set to a frequency of 1 KHz to 1000 MHz and may also be set to a frequency of 5 MHz to 15 MHz more suitable for the biofilm removal. In addition, the amplitude of the driving signal (Vd) may be set to 0.1 mv to 3 V.

Referring to FIG. 9A, the calibrator 440 may receive an AC signal (Sac') having an amplitude of A volt (V) from the filter 430, and superimpose a DC signal (Sdc) of B volt (V) as shown in FIG. 9B onto the AC signal (Sac'), thereby generating a final driving signal (Vd) as shown in FIG. 9C.

In this case, the voltage value of the DC signal (Sdc) may be set equal to or greater than the amplitude of the AC signal (Sac'). Therefore, the voltage value of the driving signal (Vd) may be set to zero or more.

As a result, the DC offset value of the driving signal (Vd) may be set equal to or greater than the amplitude of the driving signal (Vd).

When the DC offset value of the driving signal (Vd) is less than the amplitude of the driving signal (Vd), an interval in which the voltage of the driving signal (Vd) has a negative value occurs, and thus the loss of electrical energy is caused.

However, when the DC offset value of the driving signal (Vd) is set equal to or greater than the amplitude of the driving signal (Vd) as in the embodiment of the present invention, it is possible to minimize the loss of electrical energy because the voltage of the driving signal (Vd) is always zero or more.

Meanwhile, the DC signal (Sdc) may be generated by the voltage divider 450. For example, the voltage divider 450 may receive the output voltage (Vo) of the DC-DC converter 410 and generate the DC signal (Sdc) by performing voltage division on the output voltage (Vo).

The voltage divider 450 may be implemented as, but is not limited to, a resistor string for distributing the output voltage (Vo).

When the output voltage (Vo) of the DC-DC converter 410 is suitable for direct use in generating the driving signal (Vd), the output voltage (Vo) may serve as the DC signal (Sdc). In this case, the voltage divider 450 may be omitted, and the output voltage (Vo) of the DC-DC converter 410 may be inputted to the calibrator 440.

FIGS. 11A and 11B are views showing a signal supply unit according to another embodiment of the present invention.

Referring to FIGS. 11A and 11B, a signal supply unit 500 according to another embodiment of the present invention may include a DC-DC converter 510, a signal generator 520, a voltage dropper 530, a filter 540, and an offset adjuster 550.

The DC-DC converter 510 may receive a battery voltage (Vb) from the battery 350, convert the battery voltage (Vb) into an output voltage (Vo) of a predetermined level, and output the output voltage (Vo).

The signal generator 520 operates based on the voltage supplied from the DC-DC converter 510, and may generate a first AC signal (Sa1) having a predetermined frequency by using the output voltage (Vo) of the DC-DC converter 510.

The signal generator 520 may be implemented using a known configuration capable of generating an AC signal, such as an oscillator or a function generator.

For example, the first AC signal (Sa1) may be set to a frequency of 1 KHz to 1000 MHz. This is because when the first AC signal (Sa1) is set to a low frequency of less than 1 KHz, the removal effect of dental plaque is reduced, and even when the first AC signal (Sa1) is set to a very high frequency of more than 1000 MHz, the removal effect of dental plaque is reduced. Meanwhile, the frequency of the first AC signal (Sa1) may be set to a frequency of 5 MHz to 15 MHz suitable for the dental plaque removal.

The voltage dropper 530 may be used to reduce the magnitude (e.g., peak-to-peak voltage, etc.) of the first AC signal (Sa1) outputted from the signal generator 520. For example, the voltage dropper 530 may be implemented as a resistor element R, and through this, a second AC signal (Sa2) whose magnitude is reduced compared to the first AC signal (Sa1) can be supplied from the voltage dropper 530.

The filter 540 may perform a filtering operation on the second AC signal (Sa2) outputted from the voltage dropper 530. For example, the filter 540 may be set as a low pass filter including a capacitor element C and convert the second AC signal (Sa2) of sawtooth wave type into a third AC signal (Sa3) of sine wave type.

In addition, by removing an unexpected DC offset of the second AC signal (Sa2) through the filter 540, it is possible to improve the accuracy of the driving signal (Vd).

The offset adjuster 550 may generate the driving signal (Vd) by mixing the DC signal with the third AC signal (Sa3) outputted from the filter 540. For example, the offset adjuster 550 may be composed of a plurality of resistor elements R1 and R2, and may generate a DC signal of a predetermined level by performing voltage division on the output voltage (Vo) of the DC-DC converter 510.

That is, the third AC signal (Sa3) supplied through the filter 540 is superimposed onto the DC signal generated at a common node N of the first resistor element R1 and the second resistor element R2, so that a final driving signal (Vd) can be generated.

In this case, the amplitude of the driving signal (Vd) may be set to 0.1 mv to 3 V. If the amplitude of the drive signal (Vd) is less than 0.1 mV, it is difficult to expect the plaque removal effect, and if the amplitude of the driving signal (Vd) exceeds 3 V, there is a concern that toxic substances may be generated due to electrolysis of body fluids.

Those skilled in the art to which the present invention pertains will understand that the present invention can be embodied in other specific forms without changing its subject matter or essential features. Therefore, it should be understood that the embodiments described above are illustrative only and not restrictive. The scope of the present invention is defined by the claims below rather than the detailed description above, and all changes or modifications derived from the claims and their equivalents should be construed as being included in the scope of the present invention.

The invention claimed is:

1. An electric toothbrush comprising:
   an outer case including a handle part, and a head part extending from the handle part and having an opening area open to front;
   first and second electrodes disposed in the opening area and providing electromagnetic waves corresponding to a driving signal; and
   a head cover having a plurality of bristle holes, a first electrode hole, and a second electrode hole, which are formed therein, and closing the opening area,
   wherein the first and second electrodes penetrate the first and second electrode holes, respectively, and are exposed to outside,
   the electric toothbrush further comprising:
   a main substrate on which a signal supply unit for generating the driving signal is mounted, the main substrate being accommodated in the handle part; and
   a sub-substrate elongated from the main substrate toward the head part and having an end portion positioned within the opening area,
   wherein a first substrate hole and a second substrate hole are formed at the end portion of the sub-substrate, and
   wherein the first electrode is inserted into and fixed to the first substrate hole, and the second electrode is inserted into and fixed to the second substrate hole.

2. The electric toothbrush of claim 1, wherein at least one light-emitting diode (LED) is disposed at the end portion of the sub-substrate.

3. The electric toothbrush of claim 1, wherein the first electrode includes:
   a first-first electrode portion inserted into the first substrate hole, a first-second electrode portion inserted into the first electrode hole, and a first-third electrode portion disposed between the first-first electrode portion and the first-second electrode portion and electrically connected to the sub-substrate, and
   wherein the second electrode includes:
   a second-first electrode portion inserted into the second substrate hole, a second-second electrode portion inserted into the second electrode hole, and a second-third electrode portion disposed between the second-first electrode portion and the second-second electrode portion and electrically connected to the sub-substrate.

4. The electric toothbrush of claim 3, further comprising:
an inner case including a substrate support part where the main substrate is disposed and supported, and a battery accommodating part where a battery is located, the inner case being accommodated in the outer case.

5. The electric toothbrush of claim 4, wherein the main substrate has a plurality of connecting recesses, and
wherein the substrate support part has a plurality of fastening portions extending in one direction through the plurality of connecting recesses and fastened to the main substrate.

6. The electric toothbrush of claim 1, wherein the plurality of bristle holes includes at least one row of bristle holes and the at least one row of bristle holes is arranged between the first electrode hole and the second electrode hole.

* * * * *